US010218663B2

(12) United States Patent
Lehtpuu (10) Patent No.: US 10,218,663 B2
(45) Date of Patent: Feb. 26, 2019

(54) SPLITTING MESSAGE CHANNELS

(71) Applicant: Facebook, Inc., Menlo Park, CA (US)

(72) Inventor: Tarmo Lehtpuu, London (GB)

(73) Assignee: Facebook, Inc., Menlo Park, CA (US)

(*) Notice: Subject to any disclaimer, the term of this patent is extended or adjusted under 35 U.S.C. 154(b) by 387 days.

(21) Appl. No.: 15/002,159

(22) Filed: Jan. 20, 2016

(65) Prior Publication Data

US 2017/0208028 A1    Jul. 20, 2017

(51) Int. Cl.
*H04L 12/58* (2006.01)
*H04L 29/08* (2006.01)

(52) U.S. Cl.
CPC ............. *H04L 51/32* (2013.01); *H04L 51/24* (2013.01); *H04L 67/02* (2013.01); *H04L 67/146* (2013.01)

(58) Field of Classification Search
None
See application file for complete search history.

(56) References Cited

U.S. PATENT DOCUMENTS

| | | | | |
|---|---|---|---|---|
| 2011/0276627 | A1* | 11/2011 | Blechar | G06F 21/41 709/203 |
| 2012/0124202 | A1* | 5/2012 | Cooper | G06F 17/30035 709/224 |
| 2013/0254037 | A1* | 9/2013 | Foster | H04W 4/21 705/14.64 |
| 2014/0075501 | A1* | 3/2014 | Srinivasan | G06F 21/62 726/1 |
| 2014/0325055 | A1* | 10/2014 | Oh | H04L 67/22 709/224 |
| 2016/0357363 | A1* | 12/2016 | Decker | G06F 3/0482 |

* cited by examiner

*Primary Examiner* — Joseph E Avellino
*Assistant Examiner* — Tsung Y Wu
(74) *Attorney, Agent, or Firm* — FisherBroyles, LLP (57) ABSTRACT

Various embodiments include a social networking system capable of configuring message channel requests based on a browser cookie and URL subdomain. For example, the social networking system can extract a user identifier from a browser cookie of a web browser on the requesting device. The social networking system can identify a URL subdomain in the URL associated with the message channel request and select a domain-specific account identifier associated with the user identifier and the URL subdomain. The social networking system can then configure the message channel as a domain-specific channel. For example, the social networking system can select, based on the domain-specific account identifier, a content item to send over the message channel to the web browser.

20 Claims, 6 Drawing Sheets

Authenticate a member account of the social networking system by identifying, in a browser cookie, a user identifier associated with the member account
502

Receive a web-based request to establish a message channel between the social networking system and a browser tab of a web browser running on a requesting device
504

Identify a URL subdomain in the URL associated with the web-based request
506

Select a domain-specific account identifier associated with the user identifier and the URL subdomain
508

Configure the message channel as a domain-specific channel
510

Configure a client-side logic component with the domain-specific account identifier to cause client requests from the browser tab to specify the domain-specific account identifier
512

SPLITTING MESSAGE CHANNELS

BACKGROUND

Social networking systems typically provide mechanisms (referred to as channels) for members to communicate, directly and indirectly, with each other, e.g., emails, invitations, notifications, newsfeeds etc. application services of a social network system can make use of the various channels to provide useful features to the members, for example, sending out notifications about activities of a member's social connections, displaying a newsfeed of the member's activities to the member's friends, etc.

End-user devices can access a social network system via native applications or web browsers. For example, a social network system can generate dynamic social networking website for web browsers to access. For convenience, a member account usually authenticate itself with the social networking website through a web browser once, and the member account's user identifier can then be stored as a browser cookie on an end-user device's memory. The web browser can rely on the browser cookie to authenticate itself during later accessing of the social networking website. Based on the user identifier identified by the browser cookie, the social networking website can provide a set of message channels directed specifically for the user identifier. However, the use of the browser cookie limits the social networking system from providing multiple sets of message channels directed to different user identifiers.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Various embodiments disclose a social networking system that differentiates between different user account sessions (e.g., personal and domain-specific sessions) on different browser tabs of a web browser. A member of the social networking system can be associated with at least a personal member account. The social network member can also join an identity domain such that the social network member has both a personal member account and a domain-specific account associated with the identity domain. An identity domain, for example, can be set up for a corporation, an enterprise, or any other group. The social networking system can maintain separate social graphs specific for the identity domain and track the social network member using a domain-specific account identifier different from the user identifier of the personal account of the social network member. A "domain-specific session" corresponds to a browser session associated with the domain-specific account identifier instead of the personal account identifier (referred to as the "user identifier" or the "user ID").

Web browsers generally maintain a single browser cache that stores browser cookies. One of these web browsers can share its browser cookies amongst all of its browser tabs and sandbox other resources for each tab. Social networking systems may rely on browser cookies for authentication, but the sharing of the browser cookies across browser tabs may create a problem for message channels (e.g., polling-based or push-based message feed channels).

When a specific tab of a web browser establishes a client pull with the social networking system to establish a message channel, the social networking system can check both the user identifier in a browser cookie and a Uniform Resource Locator (URL) subdomain of a URL associated with the client pull request. A first tab of the web browser can establish a personal session with the social networking system. The second tab of the web browser can establish a domain-specific session with the social networking system. Both browser tabs can share the same browser cookie (e.g., associated with the domain name of the social networking system), but different URL subdomains (e.g., "WWW" for the personal session and a domain-specific token for the domain-specific session) in the URL used to access the social networking system. For example, the domain-specific token can be "AtWork" instead of "WWW."

The social networking system can thus determine whether the URL subdomain belongs to an identity domain associated with the user identifier from the browser cookie. If the URL subdomain belongs to an associated identity domain, the social networking system selects a domain-specific account identifier associated with the user identifier and the identity domain of the URL subdomain. The social network system can then pass the domain-specific account identifier to its backend services as a parameter, e.g., as part of a query string. In some embodiments, the social networking system can pass the domain-specific account identifier to a browser-side module that inserts the domain-specific account identifier as a query parameter to any further request from the specific tab of the web browser to the social networking system. The social networking system can send messages belonging to the message channel based on the domain-specific account identifier instead of based on the user identifier from the browser cookie.

Figure 1:
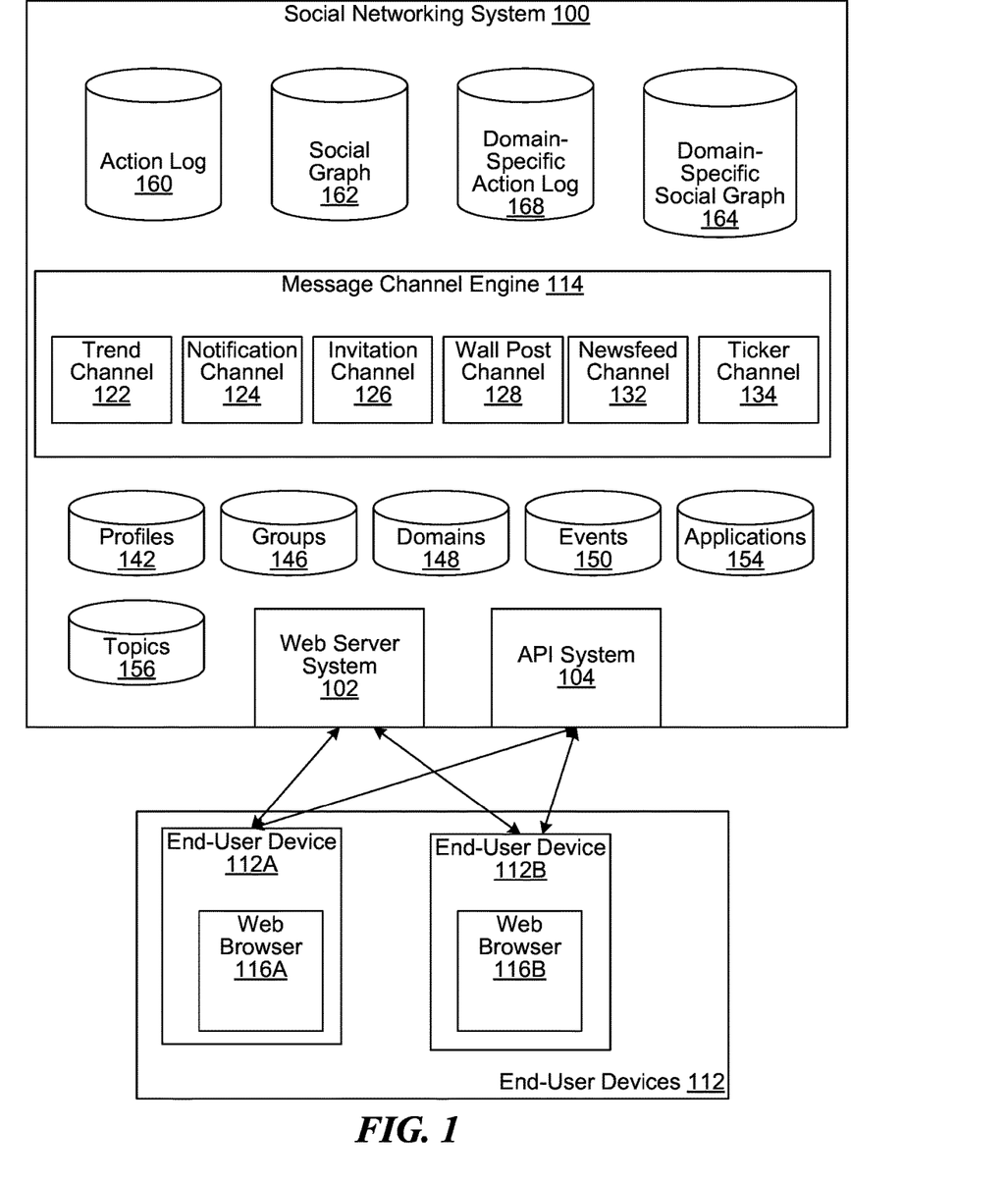
FIG. 1 is a block diagram illustrating a network environment of a social networking system, in accordance with various embodiments.

Turning now to the figures, FIG. 1 is a block diagram illustrating a network environment of a social networking system 100, in accordance with various embodiments. The social networking system 100 offers its member accounts (e.g., personal accounts or domain-specific accounts) the ability to communicate and interact with other member accounts. Member accounts can add social connections to a number of other member accounts to whom they desire to be connected in the social networking system 100. As used herein, the term "friend" refers to any other member account to whom a member account has formed a connection, association, or relationship via the social networking system 100. Connections may be added explicitly by a member account, for example, the member account selecting a particular other member account to be a friend, or automatically created by the social networking system based on common characteristics of the member accounts (e.g., member accounts who are alumni of the same educational institution). Connections in the social networking system 100 are usually in both directions, but need not be, so the terms "member account" and "friend" depend on the frame of reference. For example, if a member "Bob" and a member "Jane" are both member accounts and connected to each other in the social networking system 100, Bob and Jane, both member accounts, are also each other's friends. The connection between member accounts may be a direct connection; however, in some embodiments, the social networking system 100 enables social connections that are indirect via one or more levels of chained connections. Also, the term "friend" need not require that member accounts actually be friends in real life, (which would generally be the case when one of the member accounts is a business or other entity). The term "friend" can imply a social connection tracked in a social graph (e.g., a social graph 162) of the social networking system 100.

The member accounts can interact with each other via a web server system 102 or an application programming interface (API) system 104. The web server system 102 can provide application services (e.g., social networking services, messaging services, etc.) to end-user devices 112 (e.g., an end-user device 112A, an end-user device 112B, etc., collectively as the "end-user devices 112") when the end-user devices 112 access a social network website hosted by the web server system 102. For example, each of the end-user devices 112 can include and execute a web browser (e.g., a web browser 116A or a web browser 116B). The web browser can communicate with the application services via the web server system 102. The API system 104 can provide the application services to the end-user devices 112 through a native application (not shown) running on an operating system of the end-user devices 112.

There are various mechanisms available to member accounts to communicate with each other or to obtain information that they find interesting (e.g., activities that their friends are involved with, applications that their friends are installing, comments made by friends on activities of other friends, etc.). The mechanisms of communication for member accounts can be referred to as "channels resources." A channel is a computer-mediated communication mechanism for facilitating communication amongst member accounts of the social networking system 100 and between the member accounts and the social networking system 100.

For example, a message channel engine 114 of the social networking system 100 can implement a trend channel 122, a notification channel 124, an invitation channel 26, a wall post channel 128, a newsfeed channel 132, a ticker channel 134, or any combination thereof. The trend channel 122 can provide an open-ended feed of trending social network objects (e.g., social network topics, social network pages, social network events, etc.) to at least a member account. A social networking object can be "trending" if a threshold number of activities involving the social network object occurred or are detected within a threshold time. In some embodiments, the message channel engine 114 can configure the trend channel 122 with trending social network objects that are relevant to the member account. For example, relevancy can be determined based on the activities' and/or the social network object's associations with the member account and/or social connections of the member account.

The notification channel 124 can provide an open-ended feed of notifications to at least a member account. A notification can be a message informing the member account that some activities involving the member account have occurred or been detected in the social networking system 100. A notification can be a message informing the member account that some activities involving the social connections of the member account has occurred or been detected in the social networking system 100.

The invitation channel 126 can provide an open-ended feed of invitations to at least a member account. An invitation can be a message sent by a member account inviting another member account to do something (e.g., to install an application, to join a group, to join an identity domain, to view or interact with a social network object, to form a social connection, etc.). The wall post channel 128 can provide a list of "wall posts" for at least a member account. An application service of the social networking system can implement a "wall" for each member account, enabling other member accounts to write messages on the wall. The wall can serve as a message container. The privacy setting of the wall can be individually set by the member account to which the wall belongs to. A "wall" can enable member accounts to share information between social connections (e.g., "friends"). A message written to a member account's wall can be referred to as a "wall post." In some embodiments, a member account can post on its own wall, as well as walls of the member account's social connections. The social networking system 100 can control what is shown in the wall to the social network connections of the member account according to a privacy setting of the wall.

The newsfeed channel 132 can provide a newsfeed to at least a member account. A "newsfeed" can provide an open-ended stream of activities involving social network connections of the member account. The newsfeed can be updated continuously, periodically, or responsive to occurrences of the activities. Such activities can include a social network connection adding an application, commenting on a social network object (e.g., a photo, an event, a video, etc.), making new friends, etc. In some embodiments, some embodiments, the message channel engine 114 can organize the newsfeed as a list of news stories. Each of the news stories can include an activity by the member account or a social connection of the member account. Each new story can also include a set of related activities (e.g., comments and replies) associated with the primary activity.

The ticker channel 134 can provide a feed of ticker items to at least a member account. A "ticker feed" can provide a list of activities occurring on the social networking system 100 that are relevant to the member account. In some embodiments, the ticker feed can be a subset of the newsfeed provided in the newsfeed channel 132. In some embodiments, the ticker feed can include summaries of the activities provided in the newsfeed. For example, whereas a news story in the newsfeed can include one or more media objects and digital chatters (e.g., comments and replies) associated with the news story, each ticker item can include only a description of an actor, a description of an activity, and/or a description of a target social network object.

In addition to interactions with other member accounts, the social networking system 100 provides member accounts with the ability to take actions on various types of social network objects supported by the social networking website (e.g., provided by the web server system 102). For example, these social network objects can include groups or networks (where "networks" here refer not to physical communication networks, but rather to social networks of people) to which member accounts may belong, events or calendar entries in which a member account might be interested, computer-based applications that a member account may use via the website, and transactions that allow member accounts to buy, sell, auction, rent, or exchange items via the website.

The social networking system 100 can maintain a number of passive and/or interactive social network objects. For example, these social network objects can include member account profiles 142, group objects 146, identity domain objects 148, event objects 150, application objects 154, topic objects 156, or any combination thereof. The recorded activities in the social networking system 100 can correspond to one or more of these social network objects.

As member accounts of the social networking system 100 interact with the social network objects via the web server system 102 or the API system 104, the social networking system 100 can store records of these interactions in an action log 160. Each action can be associated with one or more social network objects. The types of actions that a member account may perform in connection with a social network object is defined for each object and can depend on the type of item (e.g., group type, event type, application type, profile type, etc.) represented by the social network object. Described below are a number of examples of particular types of social network objects that may be defined in the social networking system 100, as well as a number of actions that can be taken for each object. These social network objects and the actions/activities discussed herein are provided for illustration purposes only, and it can be appreciated that any number of variations and features can be provided in the social networking system 100.

The social networking system 100 can maintain a member account profile (e.g., one of the member account profiles 142) for each of its member accounts. In some embodiments, the social networking system 100 tracks any action that a particular member account takes with respect to another member account. The actions can be tracked in the action log 160 and processed as connections between member accounts represented in the social graph 162. In some embodiments, the tracked actions are associated with each member account's account profile. Actions may include, for example, adding a connection to the other member account, sending a message to the other member account, reading a message from the other member account, viewing content associated with the other member account, attending an event posted by another member account, etc. In addition, a number of actions described below in connection with other social network objects are directed at particular member accounts, so these actions are associated with those member accounts as well. In various embodiments, the tracked actions can be included in one or more of the channel resources provided by the message channel engine 114.

In some embodiments, the group objects 146 can represent groups tracked in the social graph 162 and the action log 160 of the social networking system 100. A group can comprise of a plurality of member accounts. For example, a member account may define a group to be a fan club for a particular band. In this example, the social networking system 100 can maintain a group for that fan club, which might include information about the band, media content (e.g., songs or music videos) by the band, and discussion boards on which member accounts of the group can comment about the band. Accordingly, member account actions that are possible with respect to a group may include joining the group, viewing the content, listening to songs, watching videos, and posting a message on the discussion board.

The event objects 150 can represent events tracked in the social graph 162 and the action log 160 of the social networking system 100. For example, an event can be a birthday party, a conference, a virtual celebration, or a holiday. A member account can create an event object by defining information about an event (e.g., the time and place and a list of invitees). Other member accounts may accept the invitation, comment about the event, post their own content (e.g., pictures from the event), and perform any other actions enabled by the social networking system 100 for the event. In various embodiments, the message channel engine 114 can include messages, invitations, updates, etc. from the event to various invitees of the event.

The social networking system 100 also enables member accounts to add applications (e.g., application services) to their profiles. These applications can be represented by the application objects 154 tracked in the social graph 162 and the action log 160. The application objects 154 can provide enhanced content and interactivity within the social networking system 100. The applications may be provided by the website operator and/or by third party developers. The use of any functionality offered by the applications may thus constitute an action by the member account in connection with the application. In some embodiments, actions can be passive and need not require active participation by a member account. For example, an action of an application subscribed to by the member account can constitute the action of the member account. Applications are generally written as server-side code that is run on servers of the social networking system 100. In some embodiments, an application includes client-side code to be executed on a browser or a native application of the social networking system 100 running on an end-user device.

In some embodiments, each of the identity domain objects 148 can represent an identity domain. Similar to a group, an identity domain can comprise of a plurality of member accounts that belong in a specialized environment (e.g., enterprise domain). However, unlike a group, a member account in an identity domain can associate with one another utilizing a viewer identifier (e.g., a domain-specific account identifier) different from the user identifier normally associated with the member account. The social networking system 100 can maintain a domain-specific social graph 164 for the identity domain that is separate and independent from the social graph 162 that is maintained for other activities tracked within the social networking system 100. Similarly, the social networking system 100 can maintain a domain-specific action log 168 for the identity domain that is separate and independent from the action log 160.

Figure 2A:
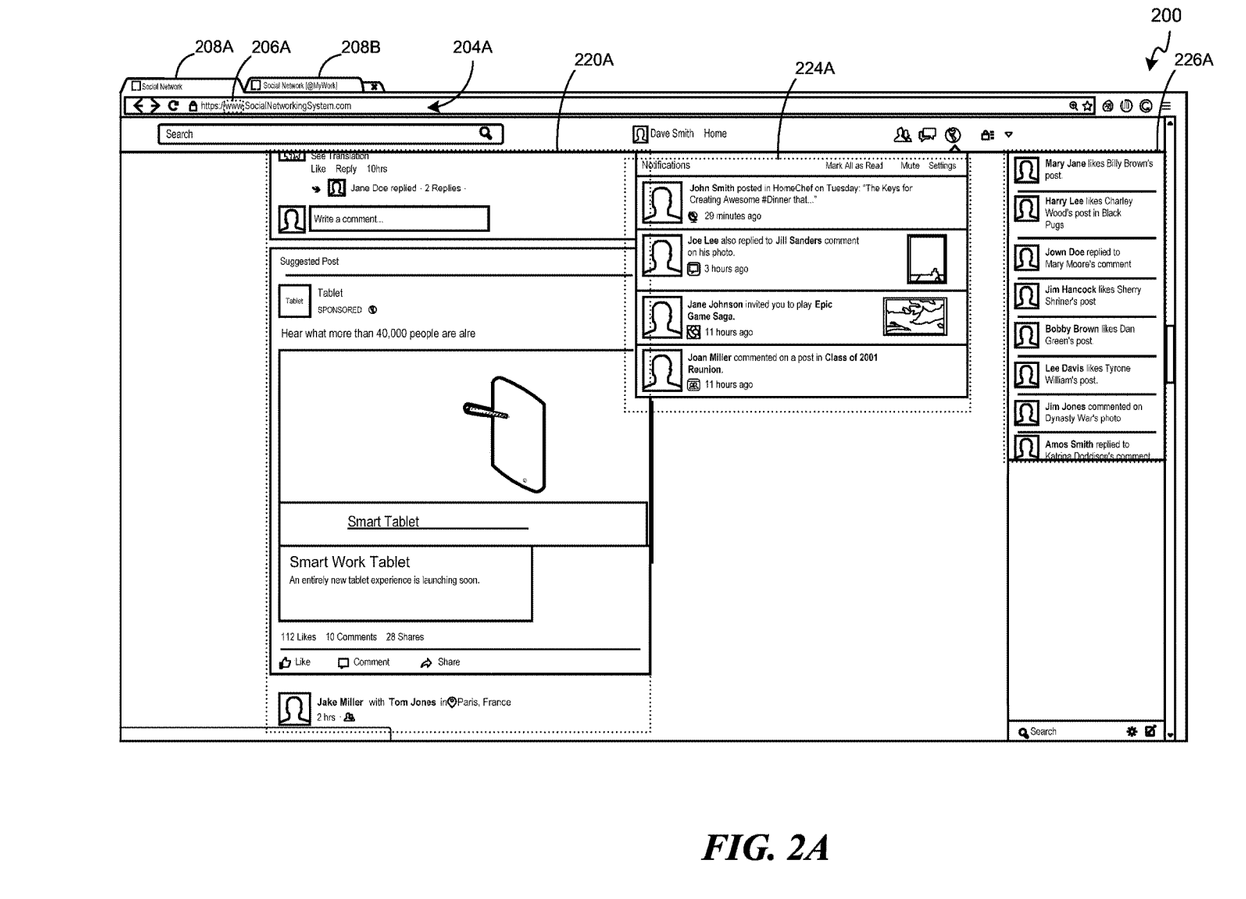
FIG. 2A is an example screenshot of a web browser rendering a social networking website at a first browser tab, in accordance with various embodiments.

FIG. 2A is an example screenshot of a web browser 200 rendering a social networking website 202 at a first browser tab 208A, in accordance with various embodiments. The web browser 200 can open a number of browser tabs (e.g., the first browser tab 208A, a second browser tab 208B, etc., collectively as the "browser tabs 208"). For example, the social networking website 202 can be opened in the first browser tab 208A by accessing a website URL 204A having a default subdomain 206A (e.g., "www"). The first browser tab 208A can display a homepage of the social networking website 202 corresponding to a personal account of a social network member of a social networking system (e.g., the social networking system 100). The first browser tab 208A can display channel resources for the personal account of the social network member.

The social networking website 202 can include a number of channel resources. Each of the channel resources can be configured according to the member accounts logged in to the social networking system through the social networking website 202. For example, the channel resources can include a newsfeed 220A, a notification feed 224A, a ticker feed 226A, or any combination thereof. In some embodiments, the social networking website 202 can include other channel services (not shown), including an event feed, an invitation feed, a trend feed, or any combination thereof.

Figure 2B:
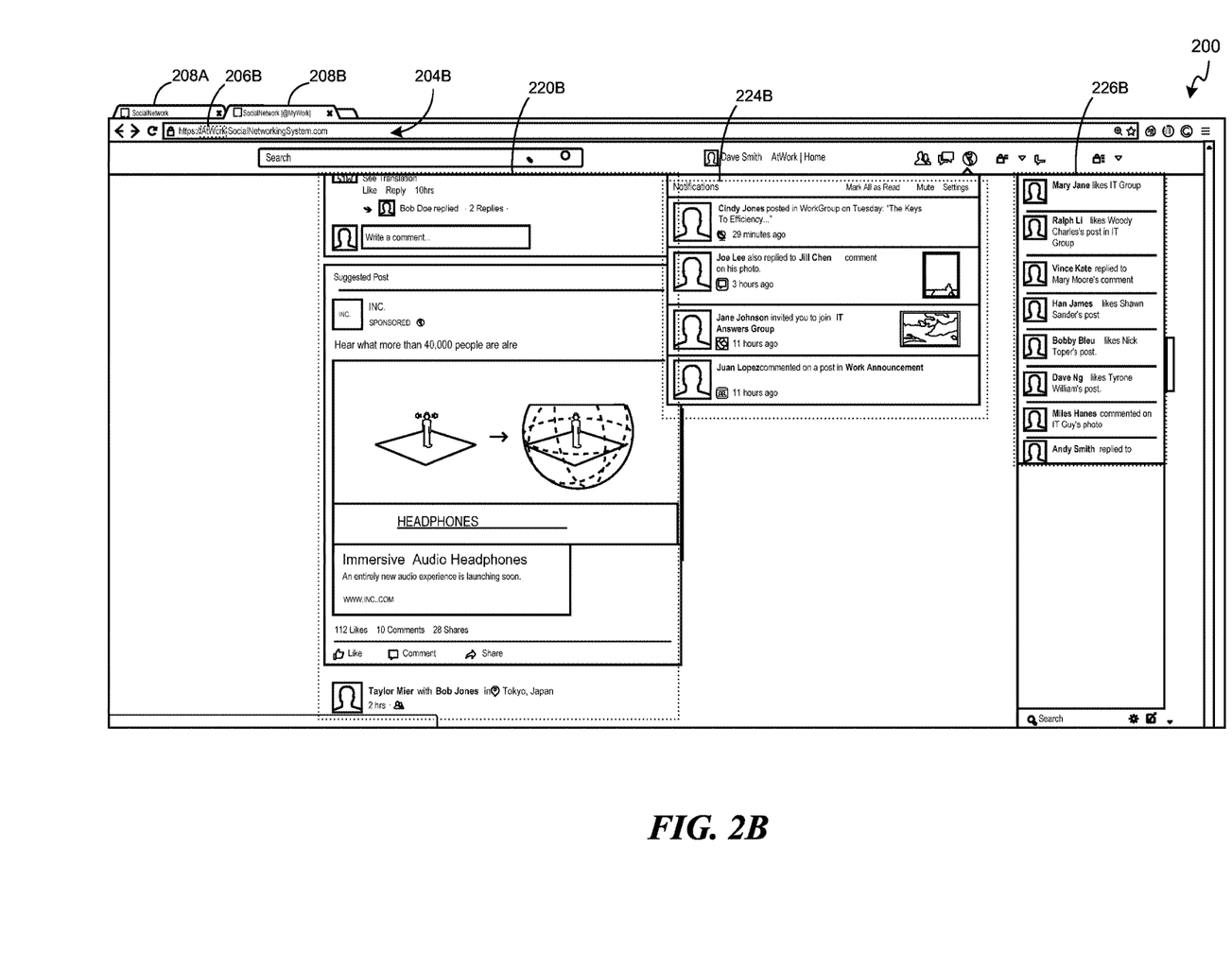
FIG. 2B is an example screenshot of the web browser of FIG. 2A rendering the social networking website at the second browser tab, in accordance with various embodiments.

FIG. 2B is an example screenshot of the web browser 200 of FIG. 2A rendering the social networking website 202 at the second browser tab 208B, in accordance with various embodiments. For example, the social networking website 202 can be opened in the second browser tab 208B by accessing a website URL 204B having a corporate subdomain 206B (e.g., "AtWork"). The second browser tab 208B can display a homepage of the social networking website 202 corresponding to a domain-specific account of the social networking system. The domain-specific account can be a corporate account of the social network member. The corporate account can be associated with an identity domain (e.g., a corporate domain) and the personal account of the social network member. The second browser tab 208B can display channel resources for the corporate account of the social network member. A message channel engine (e.g., the message channel engine 114) of the social networking system can select a different set of the channel resources (e.g., a newsfeed 220B, a notification feed 224B, a ticker feed 226B, or any combination thereof) to present in the second browser tab 208B. That is, the message channel engine can tailor the channel resources that are accessible in the corporate domain and relevant to the domain-specific account.

Figure 3:
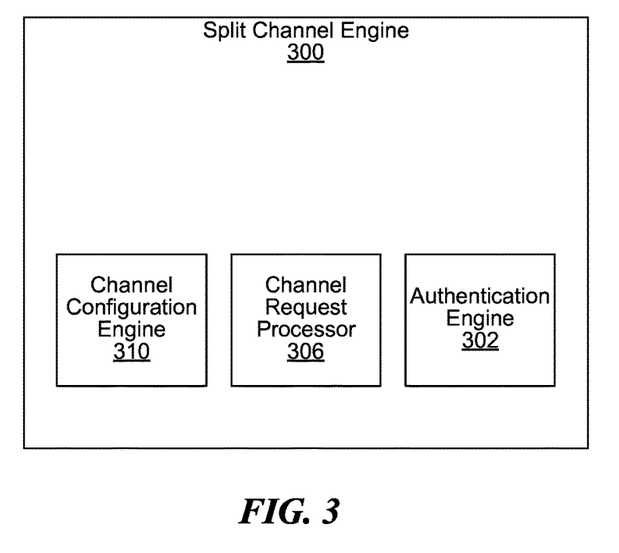
FIG. 3 is a block diagram illustrating a split channel engine in a social networking system, in accordance with various embodiments.

FIG. 3 is a block diagram illustrating a split channel engine 300 in a social networking system (e.g., the social networking system 100), in accordance with various embodiments. The split channel engine 300 can be implemented at least partially in a web server system (e.g., the web server system 102) of the social networking system. The split channel engine 300 can also be implemented at least partially in a message channel engine (e.g., the message channel engine 114) of the social networking system. The split channel engine 300 can include an authentication engine 302, a channel request processor 306, a channel configuration engine 310, or any combination thereof.

The authentication engine 302 can be configured to authenticate access to a social networking website of the social networking system. In some cases, the authentication engine 302 can authenticate a social network member based on a login username and a password provided from a requesting device. When the authentication engine 302 successfully authenticates the social network member, the authentication engine 302 can provide a browser cookie to store in a browser cache of a web browser from the requesting device. At later times before the browser cookie expires and before the browser cache is cleared, the authentication engine 302 can authenticate the social network member directly by verifying the browser cookie. For example, upon contacting the social networking website via the web browser, the authentication engine 302 can query the web browser for available browser cookies pertaining to the URL of the social networking website. The web browser can then provide a cached browser cookie to the authentication engine 302 for verification.

The channel request processor 306 can be configured to process web-based requests to establish one or more message channels (e.g., the message channels provided by the message channel engine 114) between a browser tab of a web browser and the social networking system. For example, upon authenticating a social network member, the web server system of the social networking system can provide instructions to render a webpage (e.g., in hypertext markup language (HTML) format, JavaScript, etc.). Based on the instructions, the web browser can generate a web-based request to establish a message channel. The web server system can direct the web-based request to the channel request processor 306. The channel request processor 306 can determine whether to establish a domain-specific message channel (e.g., a message channel tailored for an identity domain, such as a corporate or enterprise domain) or a personal message channel (e.g., a default channel for a personal account that is not limited to an identity domain). For example, the channel request processor 306 can make this determination based on the method 500 of FIG. 5.

The channel configuration engine 310 can receive instructions from the channel request processor 306 to establish a message channel. The channel request processor 306 can specify what type of message channels to open. The channel request processor 306 can also provide an account identifier to the channel configuration engine 310. In some cases, the account identifier is a personal account identifier, also referred to as a "user identifier." In these cases, the channel configuration engine 310 can select activities/actions involving the user identifier or social network connections of a social network member associated with the user identifier. The channel configuration engine 310 can then generate, based on the selected activities/actions, an open-ended stream of messages (e.g., a message feed) to the web browser as the message channel. The channel configuration engine 310 can continue to monitor new activities/actions that propagate through the social networking system.

In some cases, the account identifier can be a domain-specific account identifier. The domain-specific account identifier can be associated with a user identifier and a particular identity domain. In these cases, the channel configuration engine 310 can select activities/actions involving the domain-specific account identifier or social network connections to the domain-specific account in the identity domain. The channel configuration engine can then generate, based on the selected activities/actions, an open ended stream of messages (e.g., a message feed) to the web browser as the message channel. Again, the channel configuration engine 310 can continue to monitor new activities/actions that propagate through the social networking system.

In some embodiments, the channel request processor 306 can receive both a browser cookie and a query parameter from the web server system. The browser cookie can be passed to the authentication engine 302 to authenticate the channel request. The query parameter can indicate which message channel that an end-user device is requesting. In some embodiments, the channel request processor 306 can call back to the web server system to verify that the user identifier stored in the browser cookie is allowed to act as the user passed in via the query parameter. In these embodiments, the web server system can make the decision that the channel request processor 306 is allowed to identify a requesting member account, associated with the resource request, from the browser cookie.

Figure 4:
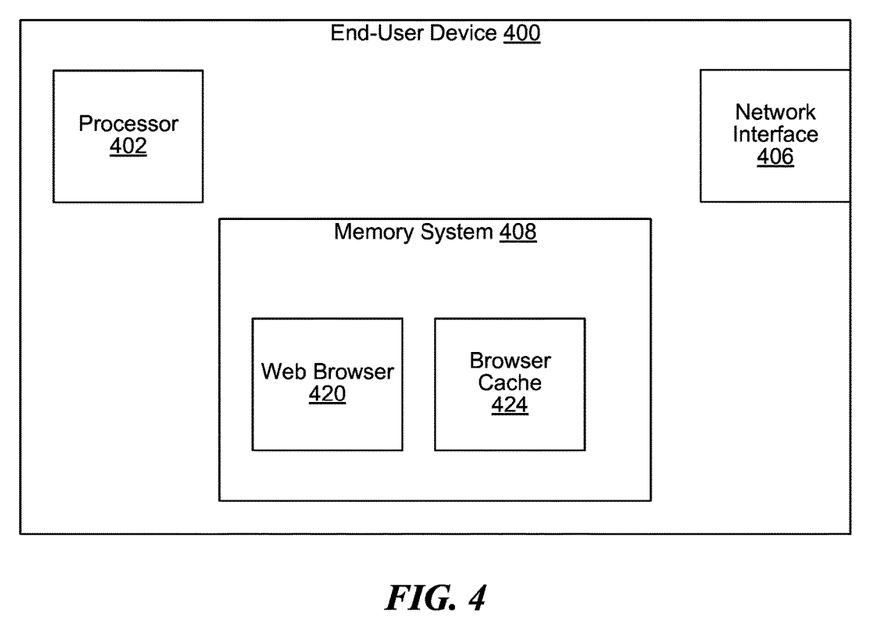
FIG. 4 is a block diagram illustrating an end-user device capable of accessing a social networking system via a web browser, in accordance with various embodiments.

FIG. 4 is a block diagram illustrating an end-user device 400 capable of accessing a social networking system (e.g., the social networking system 100) via a web browser (e.g., the web browser 200), in accordance with various embodiments. The end-user device 400 can include a processor 402, a network interface 406, and a memory system 408. The network interface 406 can be configured to communicate with external devices over a local area network or a wide area network. For example, the network interface 406 can communicate with a social networking system (e.g., the social networking system 100).

The memory system 408 can include one or more non-volatile memory components, volatile memory components, or a combination thereof. The memory system 408 can store executable instructions to implement a web browser 420. The web browser 420 is operable on the end-user device 400 when the executable instructions are executed by the processor 402. The memory system 408 can also implement a browser cache 424 that stores one or more browser cookies for the web browser.

Based on user interaction (e.g., user inputs via keyboard and mouse) with a browser tab of the web browser 420, the browser tab of the web browser 420 can be configured to browse a website of the social networking system. In some embodiments, the network interface 406 can establish a separate networking thread for each browser tab. The website can be reached via a URL (e.g., "www.SocialNetworkingSystem.com" or "AtWork.SocialNetworkingSystem.com"). The URL can include a URL subdomain. The URL subdomain (e.g., "AtWork") can be associated with an identity domain in the social networking system. The URL subdomain can also be a default subdomain (e.g., "www") that is not associated with any identity domain.

The web browser 420 can establish a network connection to a web server (e.g., the web server system 102) of the social networking system. The web server system can provide a webpage, including client-side executable scripts, to the web browser 420. For example, the client-side executable scripts can enable the web browser 420 to send a client pull to the web server to establish a message channel between the requesting browser tab of the web browser 420 and the social networking system. As part of the client pull, or in a separate authentication request, the web browser 420 can provide a browser cookie (e.g., from the browser cache 424 to the web server of the social networking system). The browser cookie can specify a user identifier corresponding to a member of the social networking system and a personal account of the member.

A split channel engine (e.g., the split channel engine 300) implemented on the social networking system can analyze the browser cookie and the browser-side authentication request to determine whether to configure the message channel with the user identifier or a domain-specific account identifier depending on whether the URL subdomain matches a URL subdomain of an identity domain participated by the member corresponding to the user identifier. In response to determining that the URL subdomain matches an identity domain of the member, the web browser 420 can receive a notification message from the social networking system corresponding to a domain-specific account identifier in the identified identity domain. The web browser 420 can then present the notification message in the browser tab that initiated the web-based request. In some embodiments, the web browser 420 can receive the domain-specific account identifier of the domain-specific account from the social networking system such that future requests from the browser tab can include the domain-specific account identifier as a parameter.

Functional/logic components (e.g., applications, engines, modules, and databases) associated with the social networking system 100 can be implemented as circuitry, firmware, software, or other functional instructions. For example, the functional/logic components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional/logic components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional/logic components may operate individually and independently of other functional/logic components. Some or all of the functional/logic components may be executed on the same host device or on separate devices. The separate devices can be coupled through one or more communication channels (e.g., wireless or wired channel) to coordinate their operations. Some or all of the functional/logic components may be combined as one component. A single functional/logic component may be divided into sub-components, each sub-component performing separate method step or method steps of the single component.

In some embodiments, at least some of the functional/logic components share access to a memory space. For example, one functional/logic component may access data accessed by or transformed by another functional/logic component. The functional/logic components may be considered "coupled" to one another if they share a physical connection or a virtual connection, directly or indirectly, allowing data accessed or modified by one functional/logic component to be accessed in another functional/logic component. In some embodiments, at least some of the functional/logic components can be upgraded or modified remotely (e.g., by reconfiguring executable instructions that implements a portion of the functional/logic components). The systems, engines, or devices described may include additional, fewer, or different functional/logic components for various applications.

Figure 5:
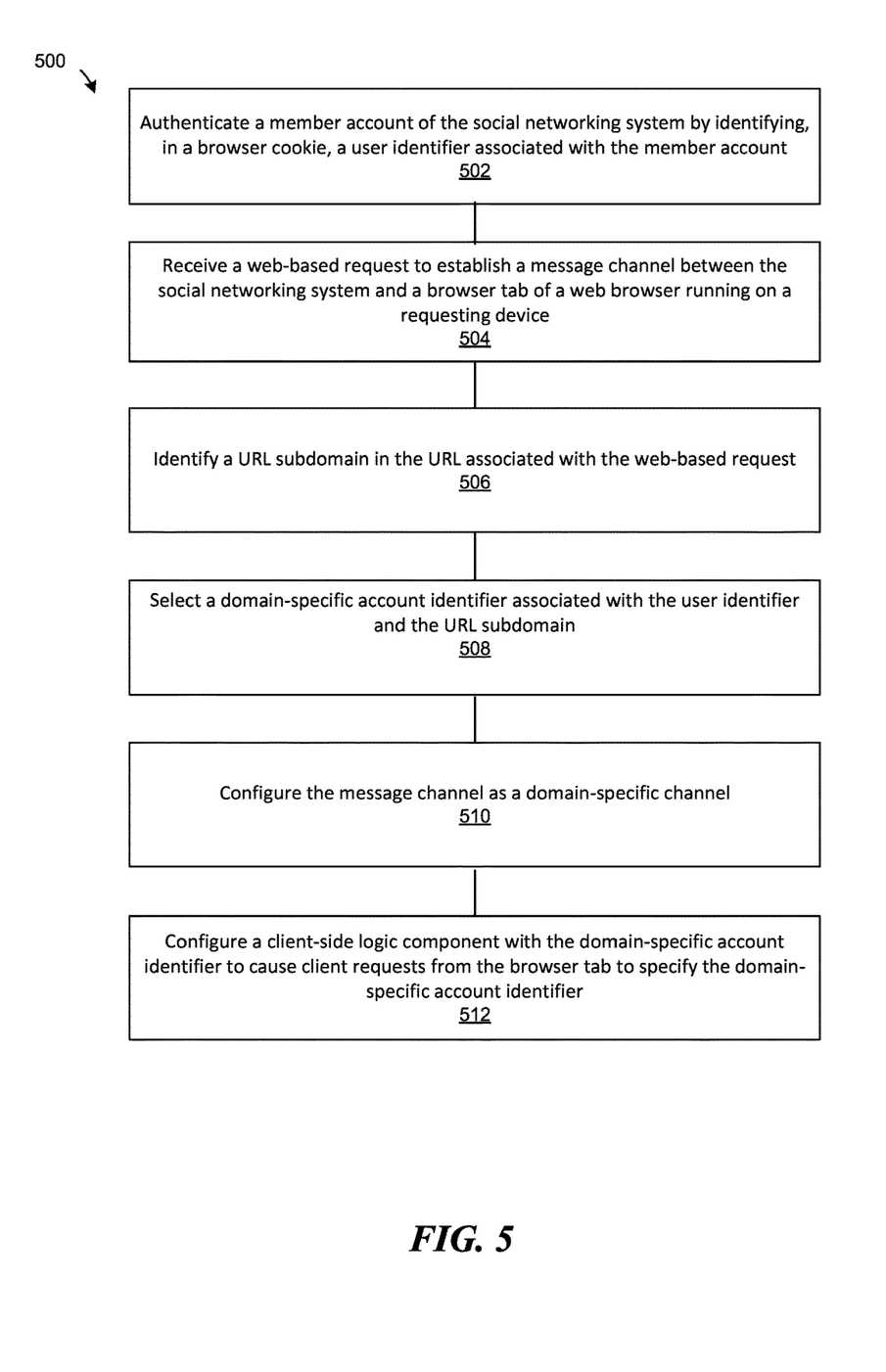
FIG. 5 is a flow diagram illustrating a method of a social networking system to provide different feed channels to different web browser tabs in a computing device, in accordance with various embodiments.

FIG. 5 is a flow diagram illustrating a method 500 of a social networking system (e.g., the social networking system) to provide different feed channels to different web browser tabs in a computing device, in accordance with various embodiments. At block 502, the social networking system can authenticate a member account of the social networking system by identifying, in a browser cookie, a user identifier associated with the member account. The social networking system can extract the user identifier from the browser cookie in a browser cache of the web browser. The social networking system can maintain member profiles associated with user identifiers, such as the extracted user identifier. The social networking system can also track social network connections associated with the user identifiers. In some embodiments, the web browser share the browser cookies amongst all of the browser tabs and sandbox other resources for each browser tab.

At block 504, the social networking system can receive a web-based request (e.g., a client pull request) to establish a message channel between the social networking system and a browser tab of a web browser running on a requesting device. The message channel can be an open ended feed (e.g., notification feed) of content items from the social networking system to the web browser. The message channel can be a notification channel, a newsfeed channel, a trend channel, a ticker channel, or any combination thereof.

The web-based request can identify a URL entered in the web browser. The URL can be associated with the social networking system. A user of the requesting device can enter the URL in the browser tab. In response, a web server system of the social networking system can provide one or more webpages and client-side script to the web browser. Part of the client-side script can trigger the requesting device to generate the web-based request.

At block 506, the social networking system can identify a URL subdomain in the URL associated with and/or specified by the web-based request. At block 508, the social networking system can select a domain-specific account identifier associated with the user identifier and the URL subdomain. In various embodiments, a single user identifier can be associated with multiple identity domains and thus multiple domain-specific account identifiers. The social networking system can select the domain-specific account identifier in response to determining that the URL subdomain is associated with an identity domain and that a social network member associated with the user identifier participates in the identity domain. Selecting the domain-specific account identifier can include accessing a member profile of the user identifier in the social networking system to determine whether the member profile is associated with the identity domain.

An identity domain is implemented in the social networking system to enable participating members to interact with each other and other social network objects of the social networking system in a sandboxed social networking environment. For example, the social networking system can maintain an isolated social graph specific to the identity domain. The isolated social graph can track only the participating members of the identity domain and social network objects associated with the participating members and/or the identity domain. The identity domain can be associated with one or more members of the social networking system and one or more domain-specific account identifiers corresponding to the members.

At block 510, the social networking system can configure the message channel as a domain-specific channel. For example, the social networking system can select, based on the domain-specific account identifier, a content item to send over the message channel to the browser tab of the web browser. For example, the social networking system can configure a message channel engine of the social networking system to tailor one or more message channels according to the domain-specific account identifier and the identity domain associated with the URL subdomain.

In at least one example, the social networking system can identify social network actions/activities that are relevant to a message channel. The social networking system can then generate a notification message belonging to the message channel based on the domain-specific account identifier instead of the user identifier within the browser cookie. The social networking system can then send (e.g., as a push message or as a response to a polling request from the requesting device) the notification message through the message channel.

In some embodiments, at block 512, the social networking system can configure a client-side logic component (e.g., client-side script that can trigger an action by the web browser) with the domain-specific account identifier. The client-side logic component can be associated with the browser tab that sent the web-based request. In some embodiments, the client-side logic component can generate further data requests to send to the social networking system. The social networking system can receive a client request from the browser tab, where the client request specifies the domain-specific account identifier as a query parameter.

The method 500 enables the social networking system to differentiate between web-based requests from different browser tabs of the web browser by differentiating between URL subdomains associated with the web-based requests. In some cases, at least one of the URL subdomains for one of the web-based requests is a default subdomain (e.g., "www"). In such cases, the social networking system can establish a personal account message channel with a browser tab that sent the web-based request with the default subdomain. The personal account message channel can be established based the user identifier from the browser cookie and no other domain-specific account identifiers.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 6:
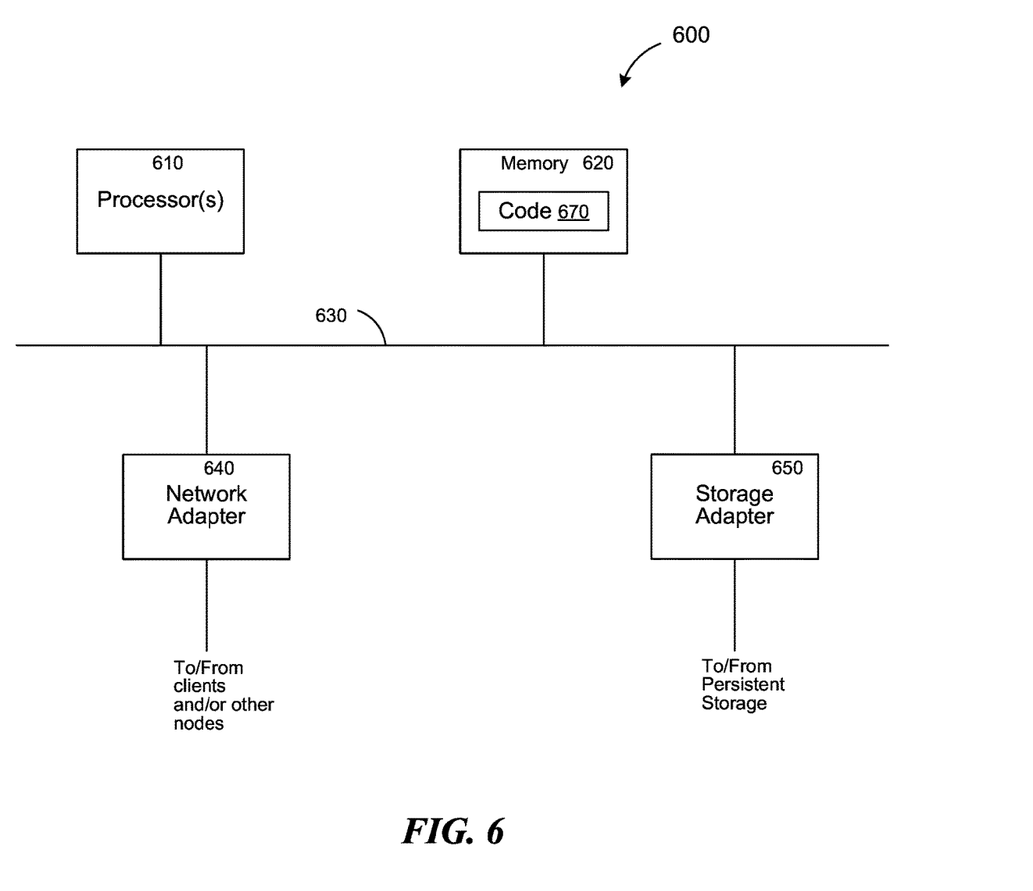
FIG. 6 is a block diagram illustrating an example of a computing device in a social networking system, in accordance with various embodiments.

FIG. 6 is a block diagram illustrating an example of a computing device 600 in a social networking system (e.g., the social networking system 100), in accordance with various embodiments. For example, the computing device 600 can represent one or more computing devices in the social networking system 100, and/or methods and processes described in this disclosure. The computing device 600 includes one or more processors 610 and memory 620 coupled to an interconnect 630. The interconnect 630 is an abstraction that represents any one or more separate physical buses, point-to-point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or a "Firewire".

The processor(s) 610 is/are the central processing unit (CPU) of the computing device 600 and thus controls the overall operation of the computing device 600. In certain embodiments, the processor(s) 610 accomplishes this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computing device 600. The memory 620 represents any form of random access memory (RAM), read-only memory (ROM), flash memory, or the like, or a combination of such devices. In use, the memory 620 may contain a code 670 containing instructions according to the systems or methods disclosed herein.

Also connected to the processor(s) 610 through the interconnect 630 are a network adapter 640 and a storage adapter

650. The network adapter 640 provides the computing device 600 with the ability to communicate with remote devices (e.g., amongst devices, components, and/or systems described in FIGS. 1-6), over a network and may be, for example, an Ethernet adapter or Fibre Channel adapter. The network adapter 640 may also provide the computing device 600 with the ability to communicate with other computers. The storage adapter 650 enables the computing device 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computing device 600 by downloading it from a remote system through the computing device 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments," "certain embodiments," or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

What is claimed is:

1. A computer-implemented method, comprising:
    extracting a user identifier from a browser cookie of a web browser running on a requesting device, wherein:
        a social network member associated with the user identifier is also associated with a plurality of social networking accounts within a social networking system, the plurality of social networking accounts comprising a personal account and a domain-specific account;
        the social network member is logged into the personal account via a first browser tab of the web browser and is logged into the domain-specific account via a second browser tab of the web browser; and
        the web browser maintains a single browser cache that stores a same set of browser cookies to share with all of the web browser's browser tabs such that both the first browser tab and the second browser tab share a same browser cookie;
    receiving, at the social networking system, a first web-based client request, sent from the second browser tab, to establish a message channel between the social networking system and the second browser tab, wherein the first web-based client request identifies a uniform resource locator (URL) entered in the web browser via the second browser tab;
    in response to receiving the first web-based client request:
        identifying a URL subdomain in the URL entered via the second browser tab that is associated with the domain-specific account and not with the personal account;
        selecting a domain-specific account identifier that is associated with the domain-specific account and not with the personal account; and
        configuring the message channel as a domain-specific channel, wherein said configuring includes selecting, based on the domain-specific account identifier, a content item, intended for the domain-specific account, to send over the message channel to the second browser tab;
    receiving, at the social networking system, a second web-based client request, sent from the first browser tab, to establish an additional message channel between the social networking system and the first browser tab, wherein the second web-based client request identifies a uniform resource locator (URL) entered in the web browser via the first browser tab; and
    in response to receiving the second web-based client request:
        identifying a URL subdomain in the URL entered via the first browser tab that is associated with the personal account and not with the domain-specific account;
        selecting a personal account identifier that is associated with the personal account and not with the domain-specific account; and
        configuring the additional message channel as a personal channel, wherein said configuring includes selecting, based on the personal account identifier, an additional content item, intended for the personal account, to send over the additional message channel to the first browser tab.

2. The computer-implemented method of claim 1, wherein the message channel is an open-ended feed of content items, including the content item selected for the second browser tab, from the social networking system to the second browser tab.

3. The computer-implemented method of claim 1, wherein the additional message channel is an additional open-ended feed of content items, including the additional content item selected for the first browser tab, from the social networking system to the first browser tab.

4. The computer-implemented method of claim 1, further comprising configuring a message channel engine of the social networking system to tailor one or more message channels according to the domain-specific account identifier and an identity domain associated with the URL subdomain in the URL entered via the second browser tab.

5. The computer-implemented method of claim 1, wherein the first web-based client request and the second web-based client request are client pulls.

6. The computer-implemented method of claim 1, wherein:
the method further comprises:
determining that the URL subdomain in the URL entered via the second browser tab is associated with the domain-specific account; and
determining that social network member participates in the domain-specific account; and
selecting the domain-specific account identifier is in response to determining that the URL subdomain in the URL entered via the second browser tab is associated with the domain-specific account and that the social network member participates in the domain-specific account.

7. The computer-implemented method of claim 6, wherein selecting the domain-specific account identifier includes accessing a member profile of the user identifier in the social networking system to determine whether the member profile is associated with the domain-specific account.

8. The computer-implemented method of claim 6, further comprising implementing the domain-specific account to enable participants of the domain-specific account to interact with each other and social network objects of the social networking system in a sandboxed social networking environment.

9. The computer-implemented method of claim 1, wherein the message channel and additional message channel represent at least one of a notification channel, a newsfeed channel, a trend channel, a ticker channel, or any combination thereof.

10. The computer-implemented method of claim 1, further comprising differentiating between web-based client requests from the first browser tab and the second browser tab by differentiating between URL subdomains associated with the web-based client requests.

11. The computer-implemented method of claim 10, wherein one of the URL subdomains is a default subdomain.

12. The computer-implemented method of claim 1, wherein the message channel comprises a computer-mediated communication mechanism for facilitating communication between member accounts of the social networking system.

13. The computer-implemented method of claim 1, further comprising configuring a client-side logic component with the domain-specific account identifier, wherein the client-side logic component is associated with the second browser tab.

14. The computer-implemented method of claim 13, further comprising receiving, at the social networking system, a client request from the second browser tab of the web browser, wherein the client request specifies the domain-specific account identifier as a query parameter.

15. The computer-implemented method of claim 1, further comprising generating a notification message belonging to the message channel based on the domain-specific account identifier instead of the user identifier within the browser cookie; and sending the notification message through the message channel.

16. A computing device, comprising:
a processor configured to implement a web browser;
a network interface configured to communicate with an external network, including with a social networking system, wherein:
a user of the computing device is a social network member who has a plurality of social networking accounts within the social networking system, the plurality of social networking accounts comprising a personal account and a domain-specific account; and
the social network member is logged into the personal account via a first browser tab and the domain-specific account via a second browser tab; and
a memory device configured to provide a browser cache that stores a same set of browser cookies to share with all of the web browser's browser tabs such that both the first browser tab and the second browser tab share a same browser cookie;
wherein the processor is further configured to:
provide a browser cookie from the browser cache to the social networking system, wherein the browser cookie specifies a user identifier corresponding to the personal account and associated with the domain-specific account;
send, from the second browser tab, a first web-based client request to establish a message channel between the social networking system and the second browser tab, wherein the first web-based client request specifies a uniform resource locator (URL), entered in the web browser via the second browser tab, with a URL subdomain that is associated with the domain-specific account and not the personal account;
send, from the first browser tab, a second web-based client request to establish an additional message channel between the social networking system and the first browser tab, wherein the second web-based client request specifies a URL, entered in the web browser via the first browser tab, with a URL subdomain that is associated with the personal account and not the domain-specific account;
receive, via the message channel, a notification message from the social networking system, wherein the notification message is selected for the domain-specific account based on both the user identifier specified in the browser cookie and the URL subdomain specified in the first web-based client request; and
receive, via the additional message channel, an additional notification message from the social networking system, wherein the additional notification message is selected for the personal account based on both the user identifier specified in the browser cookie and the URL subdomain specified in the second web-based client request.

17. The computing device of claim 16, wherein the web browser is configured to send the first web-based client request utilizing a network thread associated with the second browser tab.

18. The computing device of claim 16, wherein the web browser is configured to present the notification message in the second browser tab.

19. The computing device of claim 16, wherein the web browser is configured to send the second web-based client request utilizing a network thread associated with the first browser tab.

20. A non-transitory computer readable medium storing instructions that, when executed by a processor, cause the processor to:
  receive a web-based client request at a social networking system to establish a notification channel between the social networking system and a browser tab of a web browser running on a requesting device, wherein the web-based client request identifies a uniform resource locator (URL) associated with the social networking system;
  extract a user identifier from a browser cookie on the requesting device;
  identify a URL subdomain in the URL identified in the web-based client request;
  select a domain-specific account identifier associated with the user identifier and the URL subdomain;
  configure the notification channel as a domain-specific channel at least by selecting, based on the domain-specific account identifier, a content item to send over the notification channel to the browser tab of the web browser;
  receive an additional web-based client request to establish an additional notification channel between the social networking system and an additional browser tab of the web browser, wherein the additional web-based client request identifies an additional URL associated with the social networking system;
  extract the user identifier from the browser cookie on the requesting device;
  identify an additional URL subdomain in the additional URL identified in the additional web-based client request;
  select a personal account identifier associated with the user identifier and the additional URL subdomain; and
  configure the additional notification channel as a personal channel at least by selecting, based on the personal account identifier, a content item to send over the additional notification channel to the additional browser tab of the web browser.

\* \* \* \* \*